UNITED STATES PATENT OFFICE.

EMIL BARELL AND FRANZ ELGER, OF BASEL, SWITZERLAND, ASSIGNORS TO THE FIRM OF THE HOFFMANN-LA-ROCHE CHEMICAL WORKS, OF NEW YORK, N. Y.

HEXAMETHYLENE-TETRAMIN-MONOGUAIACOL.

979,916.      Specification of Letters Patent.      Patented Dec. 27, 1910.

No Drawing.      Application filed June 18, 1910. Serial No. 567,691.

*To all whom it may concern:*

Be it known that we, EMIL BARELL, a citizen of the Swiss Confederation, and FRANZ ELGER, a subject of the Austro-Hungarian Emperor, residing at Basel, Switzerland, have invented a certain new and useful Compound of Guaiacol and Process for Obtaining the Same, of which the following is a specification.

According to the Letters Patent of the United States of America No. 951,634, dated 8th day of March, 1910 hexamethylene-tetramin-triguaiacol is obtained by causing guaiacol to act on hexamethylene-tetramin in aqueous solution or by causing a formaldehyde-solution to act on ammoniacal guaiacol-solution in the proportions corresponding to the compound

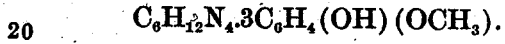
$$C_6H_{12}N_4.3C_6H_4(OH)(OCH_3).$$

Further experiments have shown, that besides the hexamethylene-tetramin-triguaiacol, there exist other stable molecular compounds of hexa-methylene-tetramin and guaiacol.

For the manufacture of hexamethylene-tetramin-monoguaiacol, guaiacol is caused to act on hexamethylene-tetramin in proportions corresponding to the compound

$$C_6H_{12}N_4.C_6H_4(OH)(OCH_3).$$

For producing the new compound, the guaiacol and the hexamethylene-tetramin may be caused to act upon each other in a dry condition. For instance, if 124 grams of guaiacol are ground together with 140 grams of hexamethylene-tetramin in a mortar, the mixture assumes at first the consistency of a broth, and then that of a thick liquid. If the grinding and stirring is continued or if the mixture is left to itself for some time, the whole solidifies again and the hexamethylene-tetramin-monoguaiacol is obtained as a dry powder.

The hexamethylene-tetramin-monoguaiacol crystallizes in the form of needles, it melts at about 90°C. and forms a clear solution with 17 parts of water. It is soluble also in cold alcohol and in chloroform. When distilled in a current of aqueous vapor, it is decomposed and yields guaiacol amounting to 46.9 of its weight.

The new compound has valuable therapeutic properties

What we claim is:—

1. The process for the production of hexamethylene-tetramin-monoguaiacol, which consists in causing guaiacol to act on the hexamethylene-tetramin in proportions corresponding to the compound

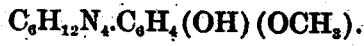
$$C_6H_{12}N_4.C_6H_4(OH)(OCH_3).$$

2. As a new product, hexamethylene-tetramin-monoguaiacol, being a compound capable of crystallizing in the shape of needles, melting at about 90° C., forming with 17 parts of water a clear solution, soluble in cold alcohol and in chloroform and yielding guaiacol 46.9 per cent. of its weight when distilled in a current of steam, substantially as described.

In testimony whereof we have hereunto set our hands in presence of subscribing witnesses.

EMIL BARELL.
FRANZ ELGER.

Witnesses:
D. FISCHER,
GEORGE GIFFORD,
H. TROENDLE,
ARNOLD ZUBER.